(12) United States Patent
McFetters

(10) Patent No.: US 12,546,412 B1
(45) Date of Patent: Feb. 10, 2026

(54) VARIABLE VENTURI VALVE

(71) Applicant: Michael D. McFetters, Saint Charles, IL (US)

(72) Inventor: Michael D. McFetters, Saint Charles, IL (US)

( * ) Notice: Subject to any disclaimer, the term of this patent is extended or adjusted under 35 U.S.C. 154(b) by 171 days.

(21) Appl. No.: 18/669,466

(22) Filed: May 20, 2024

(51) Int. Cl.
| | |
|---|---|
| *F16K 31/163* | (2006.01) |
| *F16K 31/04* | (2006.01) |
| *F16K 37/00* | (2006.01) |

(52) U.S. Cl.
CPC ........ *F16K 31/1635* (2013.01); *F16K 31/042* (2013.01); *F16K 37/0041* (2013.01)

(58) Field of Classification Search
CPC . F16K 31/1635; F16K 31/042; F16K 37/0041
See application file for complete search history.

(56) References Cited

FOREIGN PATENT DOCUMENTS

| CN | 101550902 B | * | 4/2013 | |
|---|---|---|---|---|
| CN | 203829933 U | * | 9/2014 | |
| CN | 217463358 U | * | 9/2022 | |
| CN | 219722458 U | * | 9/2023 | |
| CN | 120042542 A | * | 5/2025 | ............. G06F 30/20 |

* cited by examiner

*Primary Examiner* — Angelisa L. Hicks
(74) *Attorney, Agent, or Firm* — Steven Ivy P.C.

(57) ABSTRACT

Disclosed is an adjustable valve designed to be incorporated within a piping system to control the flow of gases or fluids. It incorporates the following components: the driver flange designed to be housed inside a rotational coupling, an opposite flange, and a cylindrical cage made up of a plurality of elongated rods encased in a flexible rod covering fused into a single cylinder by interconnecting elements. The cylindrical cage connects the driver flange to the opposite flange, facilitating the flow of fluids or gases through the piping system. The rotary actuator is designed to enable controllable rotation of the driver flange, resulting in the narrowing of the cylindrical cage, known as the throat. The opposite flange, which remains stationary during the action of the rotary actuator, can be replaced with another driver flange, creating a valve with two driver flanges, both controllable by either manual force or rotary actuators.

20 Claims, 18 Drawing Sheets

SECTION A-A

SECTION B-B

SECTION C-C

SECTION C-C

VARIABLE VENTURI VALVE

FIELD OF THE INVENTION

The current invention relates to the field of gases and fluid mechanics, specifically within the broader domain of gases and fluid flow control and engineering.

BACKGROUND OF THE INVENTION

Valves are fundamental components in piping systems, serving as crucial control points for regulating the flow of gases and fluids. These devices, ranging from simple manual valves to sophisticated automated ones, play an essential role in various industries, including oil and gas, chemical processing, water treatment, HVAC (heating, ventilation, and air conditioning), and healthcare.

There are several types of valves used in piping systems, each designed to fulfill specific functions. The most common types include gate valves (used primarily for on/off control rather than flow regulation); globe valves (offers good throttling capabilities, therefore, it is used where flow needs to be adjusted regularly); ball valves (used in applications where tight sealing is crucial); butterfly valves (used for regulating flow, particularly in large piping system); and check valves (used to prevent backflow in piping systems, ensuring that the flow of fluids or gases moves in the desired direction).

Valves also play a critical role in healthcare, particularly in medical devices and as replacements for malfunctioning body parts. In cardiovascular medicine, artificial heart valves are commonly used to replace damaged or diseased valves within the heart, ensuring proper blood flow and preventing conditions like stenosis or regurgitation. These valves can be mechanical, made from durable materials such as titanium or pyrolytic carbon, or biological, sourced from human or animal tissue, offering different benefits in terms of longevity and compatibility.

Additionally, valves are integral components in various medical devices, such as infusion pumps, which regulate the precise flow of medication into a patient's bloodstream, and respiratory devices, which control airflow to ensure adequate breathing support. The development and refinement of medical valves are crucial for enhancing patient outcomes, offering life-saving solutions, and improving the quality of life for individuals requiring these critical interventions.

Controlling and adjusting valves in piping systems is a complex task due to several inherent challenges: Precision and Accuracy: Achieving precise control over the flow rate, pressure, and temperature of gases and fluids is critical. Small deviations can lead to significant issues, such as system inefficiencies, safety hazards, or product quality problems. Automation and Integration: Modern industrial processes often require automated valve control integrated with advanced control systems. Ensuring seamless communication between valves and control systems can be challenging, particularly in large-scale operations with numerous control points. Response Time: In dynamic processes, the response time of valves to control signals is crucial. Delays or sluggish responses can disrupt operations, leading to inefficiencies and potential safety risks. Maintenance and Reliability: Valves are subject to wear and tear due to their mechanical nature and exposure to varying conditions.

Technological advancements are helping to address some of these challenges. Innovations such as smart valves, which incorporate sensors and actuators for real-time monitoring and control, are becoming increasingly common. These smart valves can provide valuable data on valve performance, enabling predictive maintenance and more precise control.

An example of a sophisticated valve designed to overcome some of these challenges is the present invention, titled the Variable Venturi Valve. Although the concept of the Venturi valve is well-established, the configurations and methods of controlling Venturi valves vary significantly. The present invention offers a new and novel design of this type of valve.

The presented valve is designed for use within a wide variety of piping systems to control the pressurized flow of gases or fluids. It consists of a driver flange, an opposite flange, a cylindrical cage, and a flexible rod covering. The valve's design enables precise control over flow rates through a mechanism that narrows or widens the throat of the cylindrical cage, thereby adjusting flow velocity and pressure. By utilizing a rotary actuator and a microcontroller, the valve can achieve precise and controllable rotation of the driver flange, resulting in reliable adjustments to flow conditions.

Additionally, the valve can be reconfigured to utilize two driver flanges and two rotary actuators in tandem. Using two rotary actuators creates a valve system with redundancy or backup in case of failure of one actuator. This dual-actuator configuration is also beneficial when the elongated rods or flexible rod coverings are made from exotic materials. These materials may be necessary for specific applications due to their toughness or durability, but they can be less flexible, making rotation difficult with only one actuator.

BRIEF SUMMARY OF THE INVENTION

The following information is intended to be a brief summary of the invention, and as such, said information shall not be used as the means of limiting the scope of the invention:

The presented invention, titled the Variable Venturi Valve ("the valve"), is an adjustable valve designed to be incorporated within a piping system to control the pressurized flow of gases or fluids. The valve comprises four main components: the driver flange, the opposite flange, the cylindrical cage, and the flexible rod covering.

The cylindrical cage is made up of a plurality of elongated rods arranged in a parallel configuration. The diameter of the elongated rods may vary depending on the application of the valve and the requirements of the end user. The cage is subdivided into three sections: the cage driver end section, the cage opposite end section, and the cage middle section. The elongated rods forming the cage are encased in a flexible rod covering and are fused together into a single, sealed cylinder by a plurality of interconnecting elements.

The driver flange, featuring a central hub, is designed to be housed inside the coupling housing of the rotational coupling, which may have varying configurations to enable connectivity to different rotary actuators. The cylindrical cage, specifically the cage driver end section, is firmly connected to the driver flange, while the cage opposite end section is connected to the opposite flange using a plurality of rod holders. The opposite flange, also having a central hub, is positioned parallel to the driver flange, with the cylindrical cage situated in the middle, thereby interconnecting the two flanges. This connection facilitates the flow of fluids or gases through the driver flange and the opposite flange, and subsequently through the piping system.

The rotary actuator, utilizing a microcontroller, is designed to enable controllable rotation of the driver flange, resulting in the narrowing of the cage middle section, known as the throat. This reduction in the diameter of the throat increases the velocity and decreases the pressure of gases or fluids flowing through the piping system. Using two rotary actuators creates a valve system with redundancy or backup in case of failure of one actuator. This dual-actuator configuration is also beneficial when the elongated rods or flexible rod coverings are made from exotic materials. These materials may be necessary for specific applications due to their toughness or durability, but they can be less flexible, making rotation difficult with only one actuator.

BRIEF DESCRIPTION OF THE DRAWINGS

The components shown in the drawings are not to scale. In the interest of clarity, some of the components might be shown in a generalized form and could be identified utilizing commercial designations. All components, including its essential features, have been assigned reference numbers that are utilized consistently throughout the descriptive process outlined herein.

DESCRIPTIVE KEY

100—variable venturi valve (the "valve")
    110—driver flange and second driver flange (wherein both flanges have identical design and functionality characteristics)
        111—driver flange central hub
    120—opposite flange
        121—opposite flange central hub
    130—cylindrical cage
        131—plurality of elongated rods (metals, plastics, composite materials)
            132—rod driver end
            133—rod opposite end
        134—cage middle section
        135—cage driver end section
        136—cage opposite end section
        137—throat
    140—plurality of rod holders
    150—flexible rod covering (flexible rod covering materials: rubber, plastic, reinforced-textiles, and various composites)
        151—plurality of interconnecting elements
    160—rotational coupling
        161—coupling housing
    170—rotary actuator and second rotary actuators; including but not limited to servo motor, stepper motor, rotary valve system, rotary gearing system; wherein both actuators have identical design and functionality characteristics
        171—microcontroller
    180—O-ring
200—piping system

DETAILED DESCRIPTION OF THE PREFERRED EMBODIMENT

The following description references to the above-defined drawings and represents only an exemplary embodiment of the invention. It is foreseeable, and recognizable by those skilled in the art, that various modifications and/or substitutions to the invention could be implemented without departing from the scope and the character of the invention:

The Venturi valve operates on the principle that when a fluid flows through a constricted section of pipe, its velocity increases while its pressure decreases. Although the concept of the Venturi valve is well-established, the designs and methods of controlling Venturi valves vary significantly. The present invention introduces a novel approach to constructing and controlling a valve that employs the same principle of narrowing the midsection to regulate the pressurized flow of gases or fluids.

As shown in FIGS. 1-18, the presented invention, titled the Variable Venturi Valve ("the valve") 100, is an adjustable valve, incorporating the Venturi principal, and is designed to be incorporated within a piping system 200 to control the pressurized flow of gases or fluids.

Figure 4:
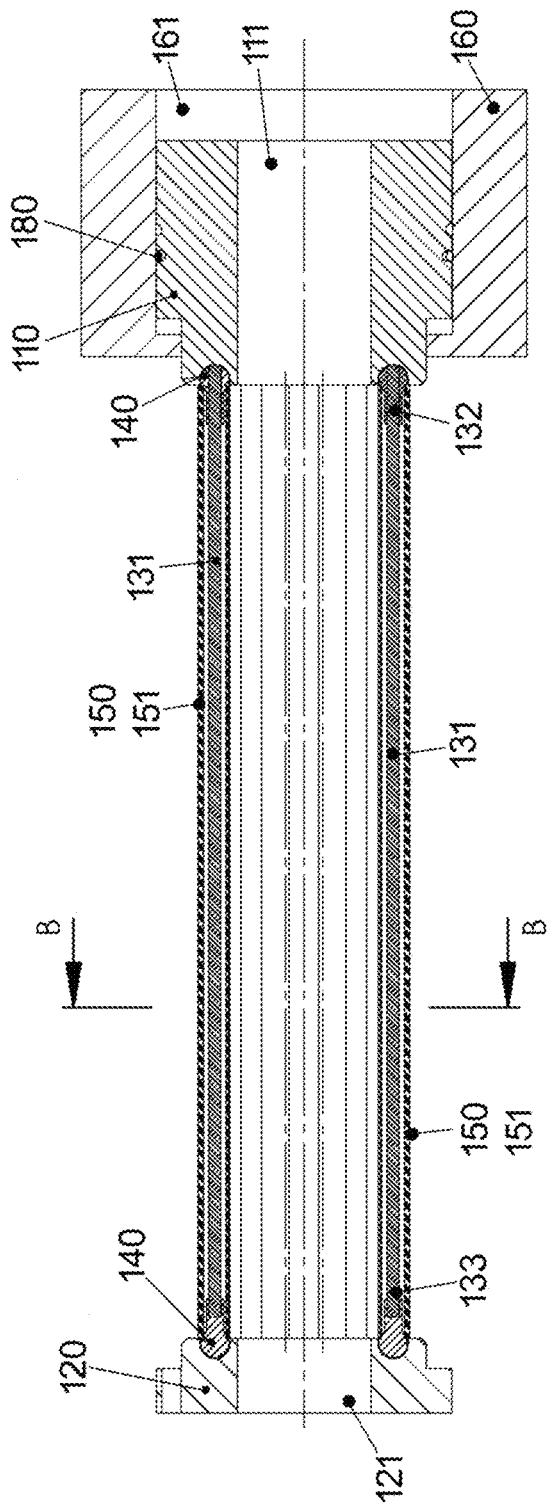
FIG. 4 provides a sectional view A-A, illustrating all components of the valve, identified using descriptive key numbers. The components are differentiated by various forms of hatching. The figure shows the locations of the driver flange, the opposite flange, the rotational coupling, and the cylindrical cage composed of a plurality of elongated rods. Additionally, it depicts the locations of the rod driver ends and rod opposite ends, as well as the plurality of rod holders connecting these ends to the driver flange and the opposite flange. The figure also indicates the location of the B-B sectional view. In accordance with an exemplary embodiment of the present invention.
Figure 5:
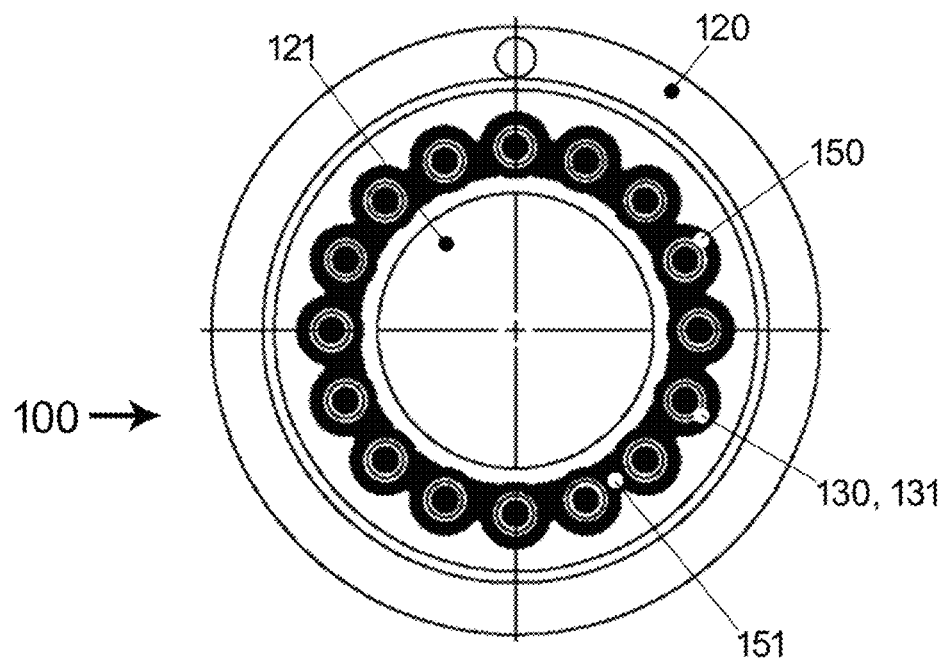
FIG. 5 provides a sectional view B-B, focusing on the cylindrical cage, which comprises a plurality of elongated rods encased in a flexible rod covering. Attached to this covering are multiple interconnecting elements, forming a cylinder that facilitates the flow of gases and fluids through it. In the background, the opposite flange is shown, to which the cylindrical cage is connected using a plurality of rod holders (not visible in this figure). In accordance with an exemplary embodiment of the present invention.

The valve comprises four main components: the driver flange 110, the opposite flange 120, the cylindrical cage 130, and the flexible rod covering 150, as shown in FIGS. 4 and 5. The cylindrical cage 130 consists of a plurality of elongated rods 131 arranged in a parallel configuration to form a cylindrical substructure. Each of the elongated rods 131 has a rod driver end 132 and a rod opposite end 133, as depicted in FIGS. 4 and 6.

Figure 13:
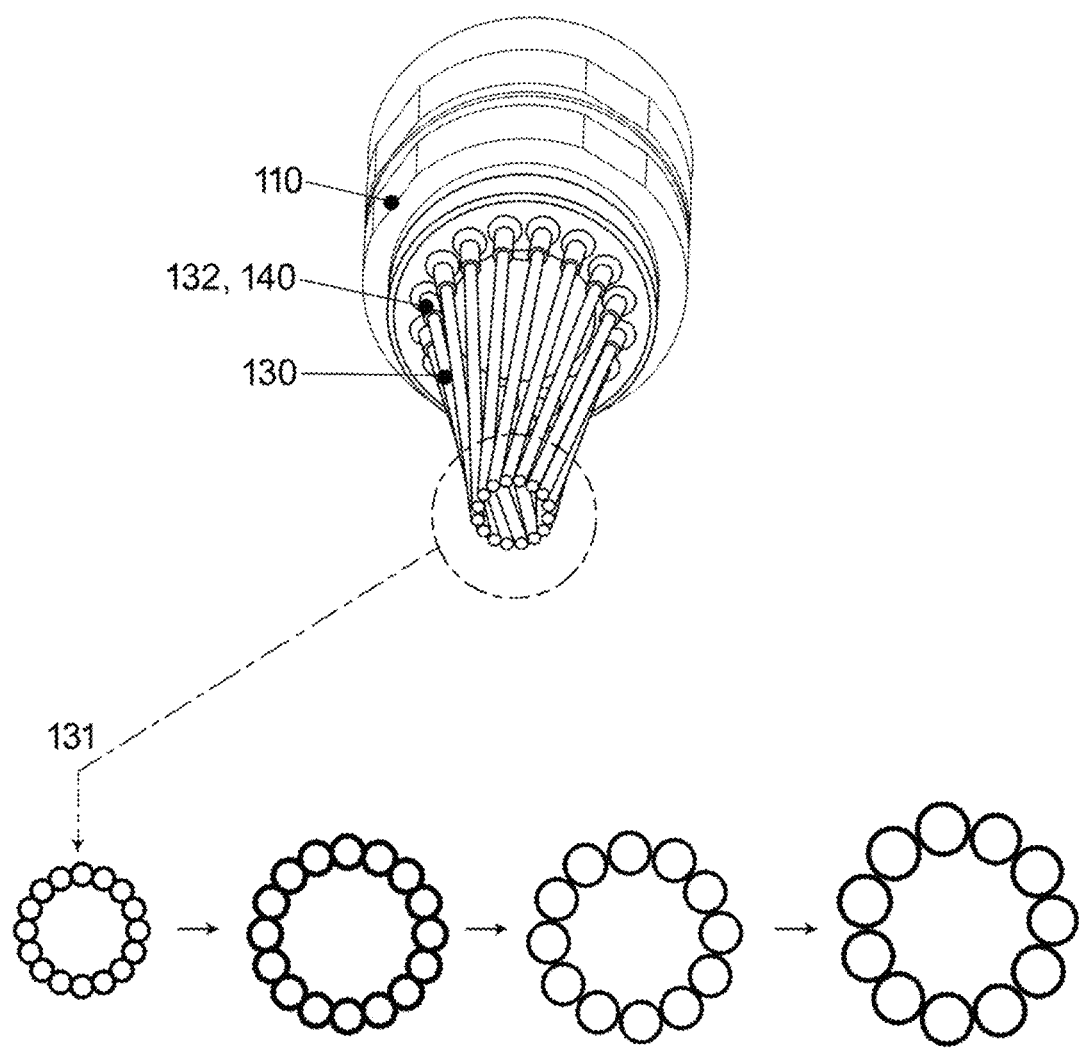
FIG. 13 shows a sectional view of the valve, previously depicted in FIGS. 11 and 12 as section C-C, using the descriptive key to identify various related components, such as the driver flange and the cylindrical cage attached to it via a plurality of rod holders. The figure also focuses on the sectioned throat of the cylindrical cage, revealing the bundle of 16 elongated rods forming the throat. This throat is the narrowest section of the valve, where the flow velocity of gas and liquid increases upon predetermined action of the rotary actuator. Additionally, the figure presents three other examples of the sectioned throat, illustrating that the configuration of the rods, including the quantity and diameter of the elongated rods, can vary. These variations can be made to meet the end user's needs, as the rods' and throat's diameter, are critical to achieving the desired flow characteristics in the valve. In accordance with an exemplary embodiment of the present invention.

As shown FIG. 13, the diameter of the elongated rods 131 may vary depending on the application of the valve 100 and the requirements of the end-user. Equally important is the material used for manufacturing the rods 131. The rods could be made from a wide variety of exotic materials with properties suitable for specific applications and environments in which the valve will be utilized (e.g., medical or oil and gas industry applications).

Some of these exotic materials used for manufacturing the rods 131 include titanium alloys, inconel, hastelloy, monel, tantalum, carbon fiber-reinforced polymers, beryllium, and kevlar. Each of these materials offers distinct advantages in terms of strength, weight, thermal properties, and corrosion resistance, making them suitable for specific high-performance applications where traditional materials might not suffice. However, the most commonly used materials for manufacturing the rods 131 are typical metals and reinforced plastics.

Figure 6:
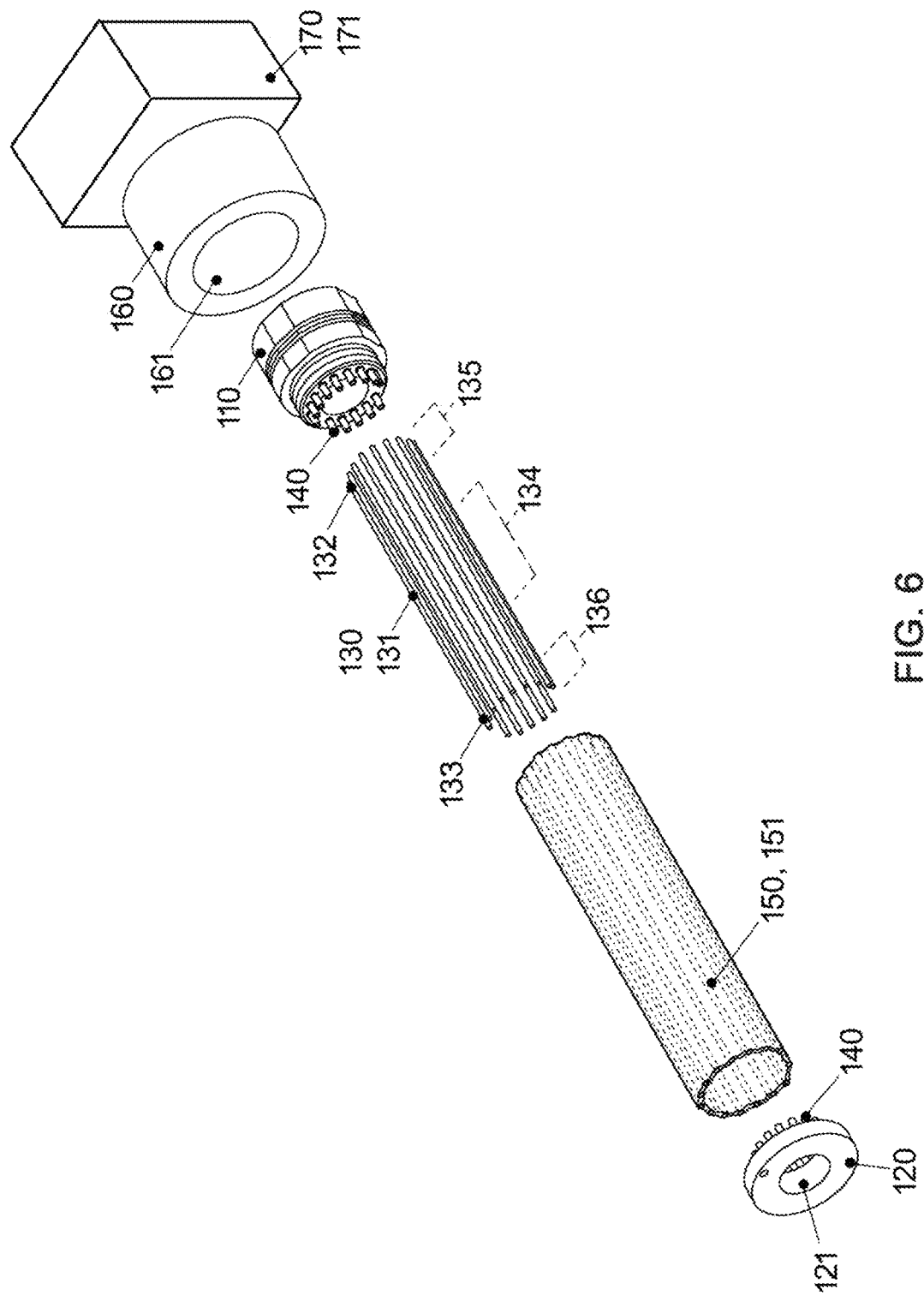
FIG. 6 provides an exploded view of the valve, separating its six primary components, identified using descriptive key numbers: (1) the opposite flange in the foreground, (2) the flexible rod covering with a plurality of interconnecting elements, (3) the cylindrical cage made up of a plurality of elongated rods, (4) the driver flange, (5) the rotational coupling, and (6) the rotary actuator incorporating the microcontroller. Additionally, the figure indicates the positioning of the cage's middle section, the cage driver end section, and the cage opposite end section. In accordance with an exemplary embodiment of the present invention.
Figure 7:
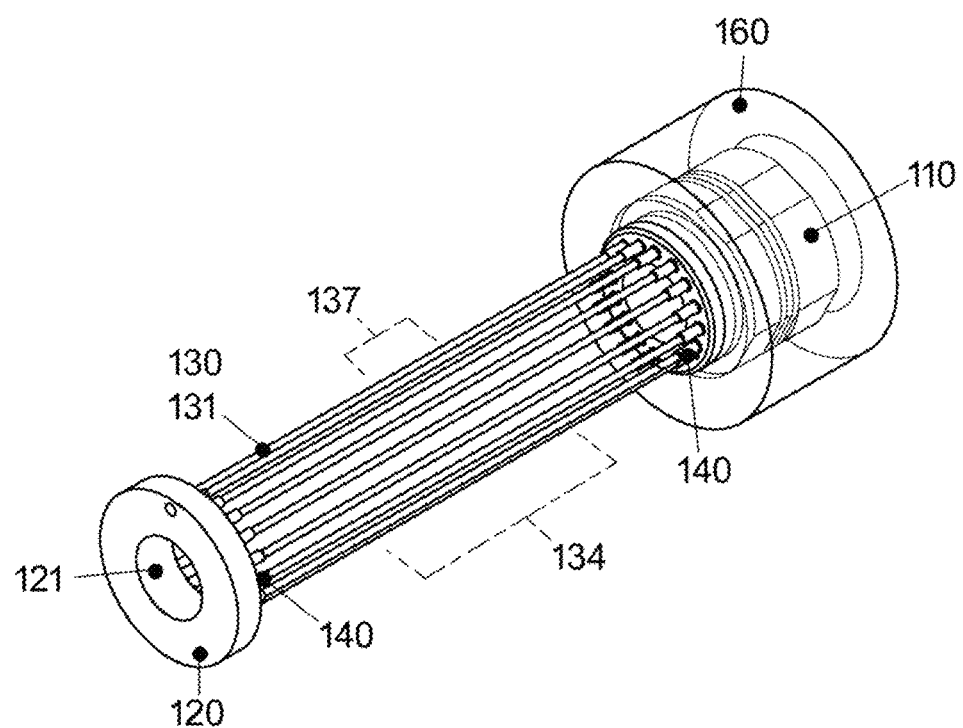
FIG. 7 shows a perspective view of the valve. In the foreground is the opposite flange, to which the cylindrical cage is attached using a plurality of rod holders. The cylindrical cage is shown without the flexible rod covering, and it interconnects the opposite flange with the driver flange. These connections are done using a plurality of rod holders. The positioning of the rotational coupling is outlined with a thin line to show the full size and placement of the driver flange inside it. The figure also indicates the location of the cage middle section and located within the throat. The throat refers to the narrowest section of the valve where the flow velocity of a gas/fluid increases and its pressure decreases; the throat's diameter is critical for achieving the desired flow characteristics which are predetermined and programmed into the rotary actuator via the microcontroller. In accordance with an exemplary embodiment of the present invention.
Figure 8:
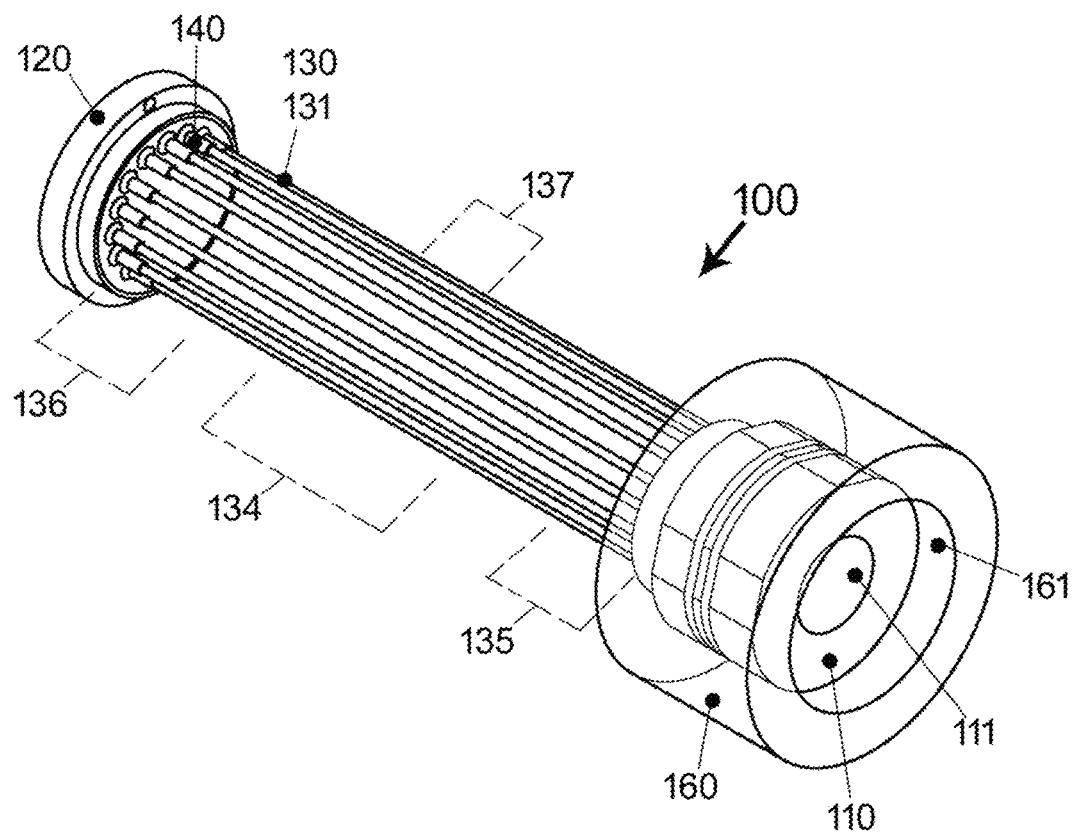
FIG. 8 shows a perspective view of the valve. In the foreground is the driver flange, to which the cylindrical cage is attached using a plurality of rod holders. The cylindrical cage is shown without the flexible rod covering, and it interconnects the driver flange with the opposite flange. These connections are done using a plurality of rod holders. The positioning of the rotational coupling is outlined with a thin line to show the full size and placement of the driver flange inside it. The figure also indicates the location of the cage middle section and located within the throat. The throat refers to the narrowest section of the valve where the flow velocity of a gas/fluid increases and its pressure decreases; the throat's diameter is critical for achieving the desired flow characteristics which are predetermined and programmed into the rotary actuator via the microcontroller. In accordance with an exemplary embodiment of the present invention.
Figure 9:
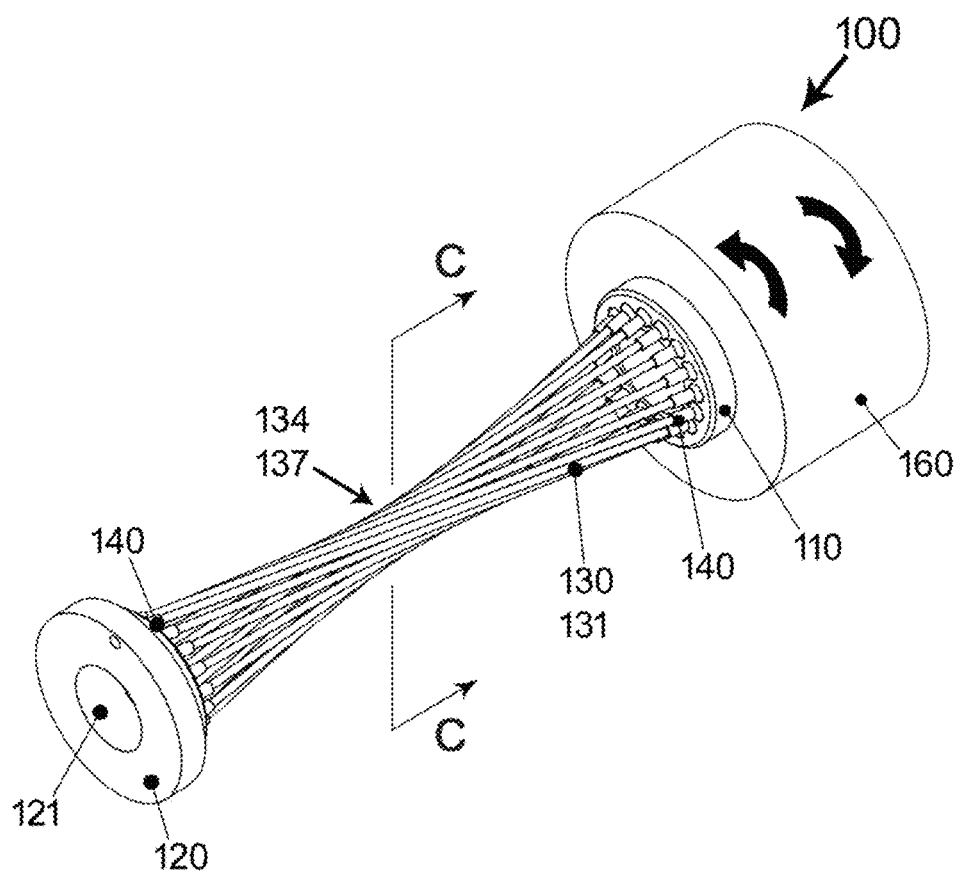
FIG. 9 presents a perspective view of the valve. In the foreground, the opposite flange is visible, to which the cylindrical cage is affixed using a plurality of rod holders. The cylindrical cage, depicted without the flexible rod covering, serves to connect the opposite flange with the driver flange (situated within the rotational coupling), with both connections facilitated by a plurality of rod holders. The figure also highlights the location of the throat, the narrowest section of the valve where the flow velocity of a gas/fluid increases. This throat is created by the rotation (either clockwise or counterclockwise) of the driver flange. Additionally, the figure indicates the position of the sectional view C-C, provided in FIGS. 11 and 12. In accordance with an exemplary embodiment of the present invention.
Figure 10:
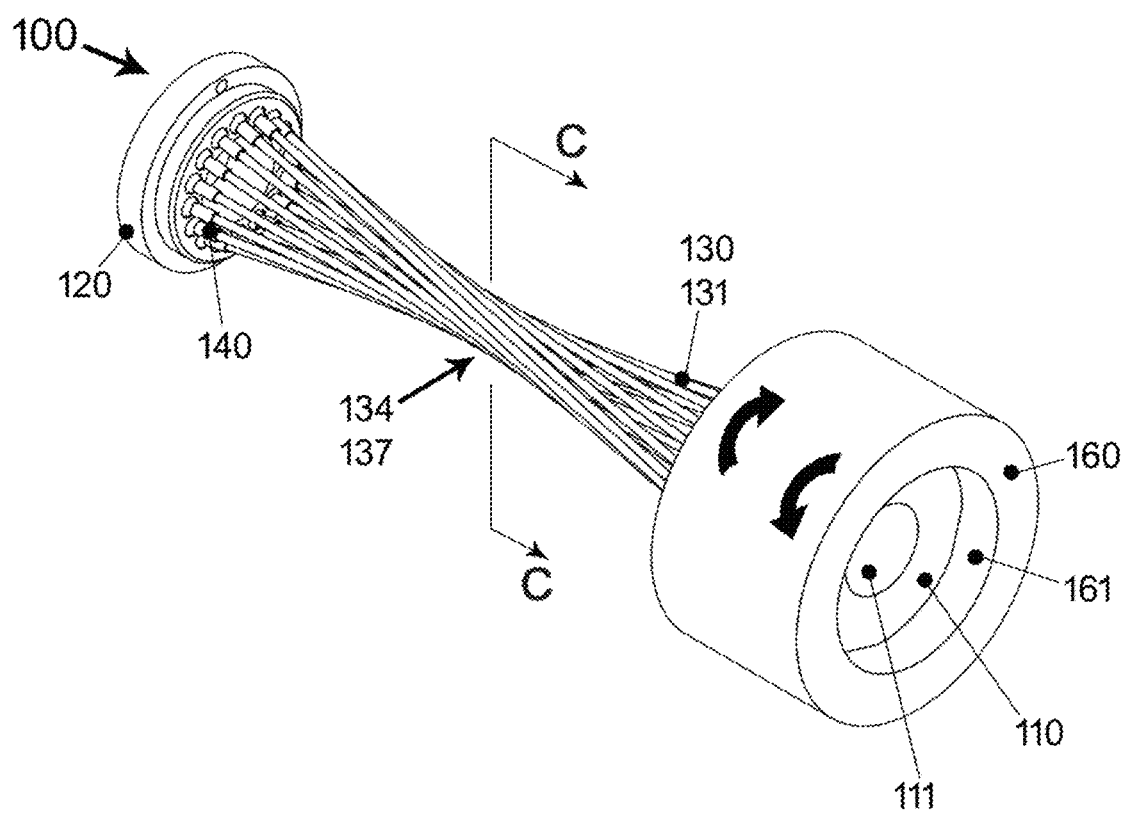
FIG. 10 shows a perspective view of the valve. In the foreground, the driver flange is visible, to which the cylindrical cage is affixed using a plurality of rod holders. The cylindrical cage, depicted without the flexible rod covering, serves to connect the opposite flange with the driver flange (situated within the rotational coupling), with both connections facilitated by a plurality of rod holders. The figure also highlights the location of the throat, the narrowest section of the valve where the flow velocity of a gas/fluid increases. This throat is created by the rotation (either clockwise or counterclockwise) of the driver flange. Additionally, the figure indicates the position of the sectional view C-C, provided in FIGS. 11 and 12. In accordance with an exemplary embodiment of the present invention.
Figure 11:
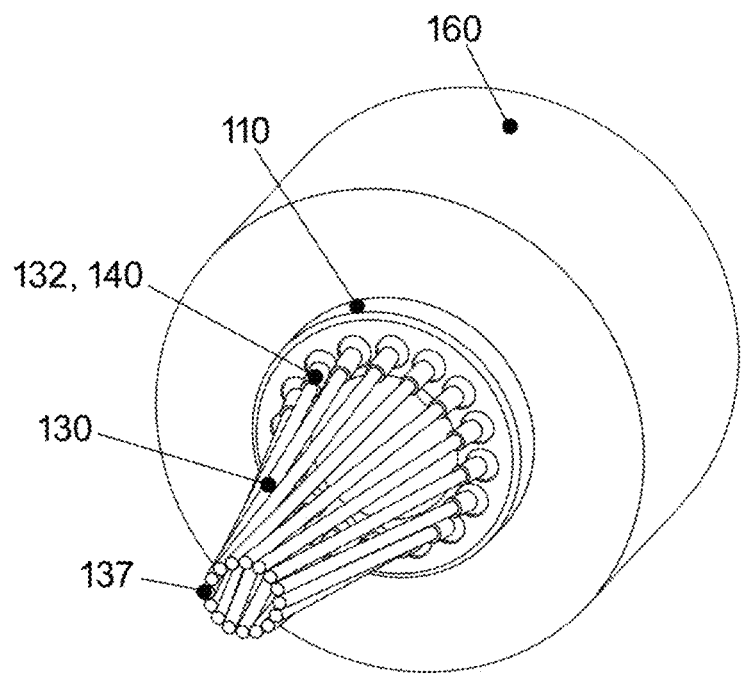
FIG. 11 shows a sectional view C-C of the valve. The figure employs a descriptive key to label components of the valve, including the rotational coupling, the driver flange, and the cylindrical cage constructed from a plurality of elongated rods and connected to the driver flange via a plurality of rod holders. The figure illustrates the cylindrical cage being severed at the throat, demonstrating the narrowest section of the valve where the flow velocity of gas/liquid increases upon predetermined action of the rotary actuator. In accordance with an exemplary embodiment of the present invention.
Figure 12:
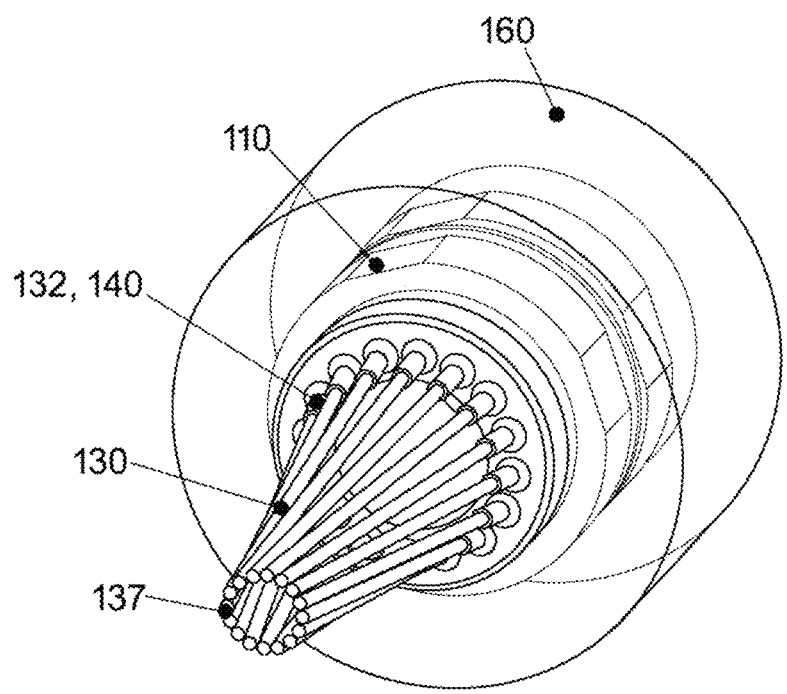
FIG. 12 displays a sectional view C-C of the valve. The figure utilizes a descriptive key to identify components of the valve, such as the driver flange and the cylindrical cage made from a plurality of elongated rods, which are connected to the driver flange via a plurality of rod holders. The figure depicts the cylindrical cage being severed at the throat, highlighting the narrowest section of the valve where the flow velocity of gas/liquid increases upon predetermined action of the rotary actuator. Additionally, the positioning of the rotational coupling is represented by a thin continuing line to reveal the driver flange situated within. In accordance with an exemplary embodiment of the present invention.

As shown in FIGS. 6 and 8, the structure of cylindrical cage 130 is subdivided into three sections: the cage driver end section 135, the cage opposite end section 136, and the cage middle section 134. The cage driver end section 135 is made up of the rod driver ends 132, and the cage opposite end section 136 is made up of the rod opposite ends 133.

The elongated rods 131, which comprise the cage, are enveloped in a flexible rod covering 150 and seamlessly fused into a unified, sealed cylinder by a series of interconnecting elements 151, as depicted in FIGS. 4, 5, and 6. Like the rods 131, the materials utilized for the flexible rod covering 150 and its interconnecting elements 151 exhibit a broad spectrum, contingent upon the specific requirements of the valve's application. Nonetheless, the predominant materials for these components typically include rubber, plastic, reinforced textiles, and various composite materials.

The driver flange 110, featuring a driver flange central hub 111, is designed to be housed inside the coupling housing 161 of the rotational coupling 160, as shown in FIG. 4. The rotational coupling 160 will have varying configurations to enable direct or indirect connectivity to different rotary actuators 170.

The most commonly utilized actuators will include servo motors, stepper motors, rotary valve systems, and rotary gearing systems. It is conceivable that devices commonly recognized as rotary actuators could be substituted with other presently known or yet-to-be-invented devices capable of fulfilling the role of a rotary actuator.

The cage driver end section 135 of the cylindrical cage 130 is securely attached to the driver flange 110, and the cage opposite end section 136 is linked to the opposite flange 120 through a series of rod holders 140, as shown in FIG. 4. These rod holders 140 are integrated within the flexible rod covering 150, and combined with the rods 131, establish a completely sealed cylindrical space. This configuration ensures a tight seal and proper connection between the driver 110 and opposite 120 flanges.

Figure 1:
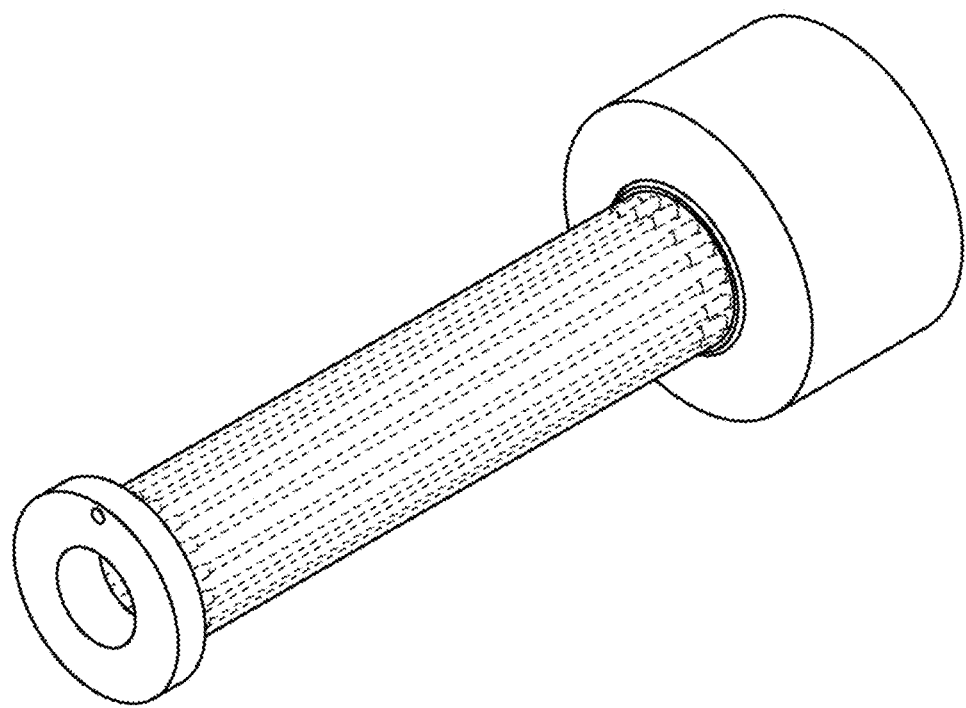
FIG. 1 is a perspective view of the current invention titled Variable Venturi Valve (the "valve"). The figure shows, in the foreground, an opposite flange containing an opposite flange central hub, and a driver flange, which is situated inside a rotational coupling. These two components, the driver flange and the opposite flange, are interconnected by a cylindrical cage comprising a plurality of elongated rods encased in a flexible rod covering. Each of the elongated rods is fused together via a plurality of interconnecting elements, forming the valve that facilitates the flow of gases and fluids through the driver flange, the opposite flange, and the cylindrical cage. In accordance with an exemplary embodiment of the present invention.
Figure 2:
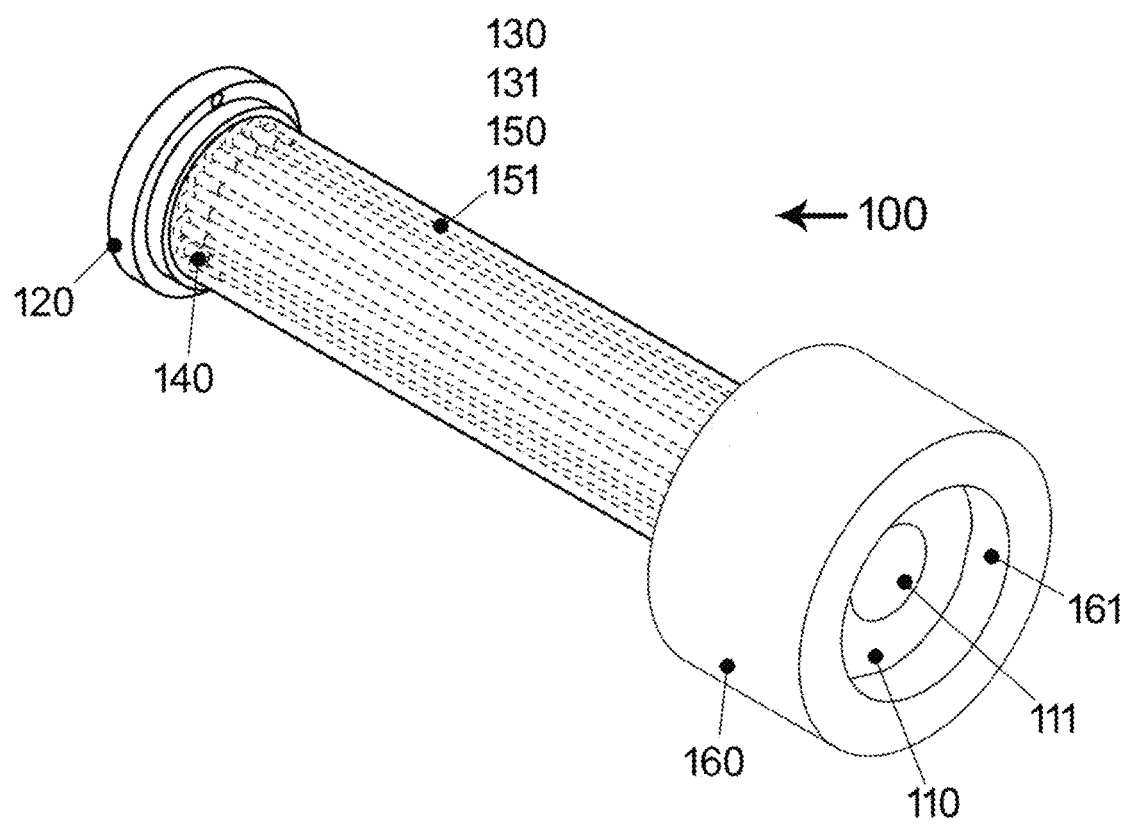
FIG. 2 is a perspective view of the valve, using descriptive key numbers to identify the primary components of the valve, and its subcomponents. The figure shows, in the foreground, a driver flange with a driver flange central hub. The driver flange is situated inside a rotational coupling, specifically within a coupling housing. Connecting the driver flange to the opposite flange is a cylindrical cage composed of a plurality of interconnecting rods. These rods are connected to the driver and opposite flanges using a plurality of rod holders. The elongated rods are encased in a flexible rod covering, which, along with a plurality of interconnecting elements, forms a fully enclosed cylinder. This design enables the flow of gases and fluids through the three main components: the driver flange, the opposite flange, and the cylindrical cage. In accordance with an exemplary embodiment of the present invention.
Figure 3:
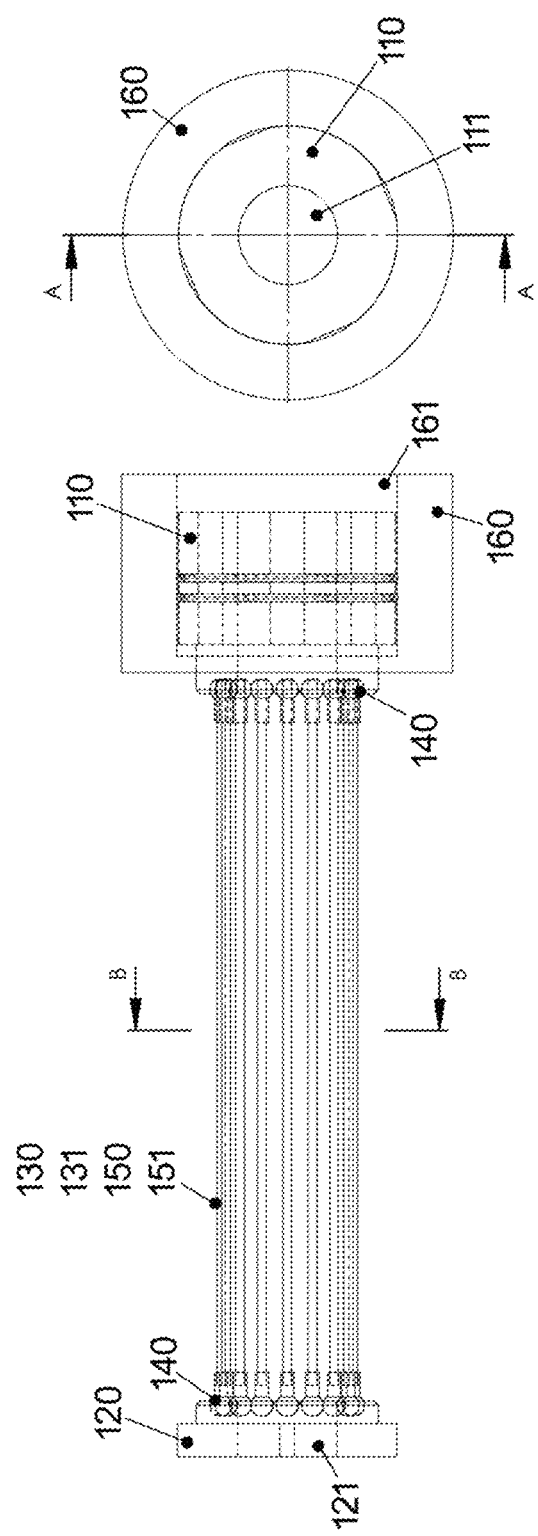
FIG. 3 provides a side view and a front view of the valve, using descriptive key numbers to identify its primary components and their subcomponents. The side view shows the driver hub, the opposite hub, the cylindrical cage, and the rotational coupling. The side view also indicates the location of the B-B sectional view, which is provided in FIG. 5. To the right is the front view of the rotational coupling and its coupling housing, with the driver hub shown inside it. In accordance with an exemplary embodiment of the present invention.

As shown in FIGS. 2, 3 and 4, the opposite flange 120, also having an opposite flange central hub 121, is positioned parallel to the driver flange 110, with the cylindrical cage 130 situated in the middle, thereby interconnecting the two flanges 110 and 120. This connection facilitates the flow of fluids or gases through the driver flange 110 and the opposite flange 120, and subsequently through the piping system 200.

The rotary actuator 130, utilizing a microcontroller 171, is designed to enable controllable rotation of the driver flange 110, resulting in the narrowing of the cage middle section 134, thereby creating a throat 137, shown in FIGS. 9-13. The design and operation of the throat 137 are critical for the valve's 100 function, as it directly impacts the flow characteristics and the ability to manage pressure differentials.

Figure 14:
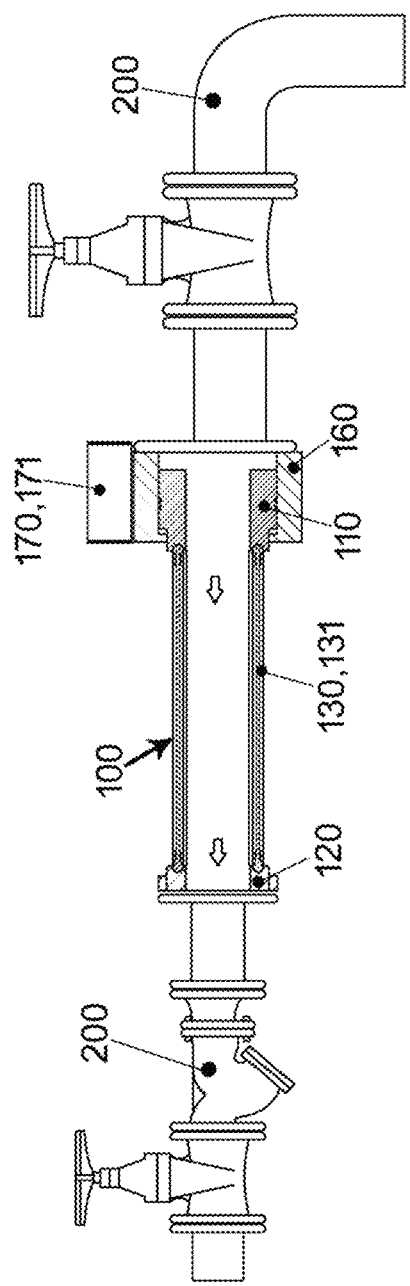
FIG. 14 shows a piping system incorporating the valve. In this example, the valve is depicted in a sectional view to display its internal structure in an open position. The view uses the descriptive key to identify the various components of the valve, including the cylindrical cage made up of a plurality of elongated rods, the opposite flange, the driver flange, and the rotational coupling designed to house the driver flange within its coupling housing. The figure also identifies the usage of the rotary actuator and the microcontroller. The rotary actuator can have multiple configurations and mounting options (purposely not identified in this document), which can be configured to controllably rotate the driver flange, thereby adjusting the throat's diameter. In accordance with an exemplary embodiment of the present invention.
Figure 15:
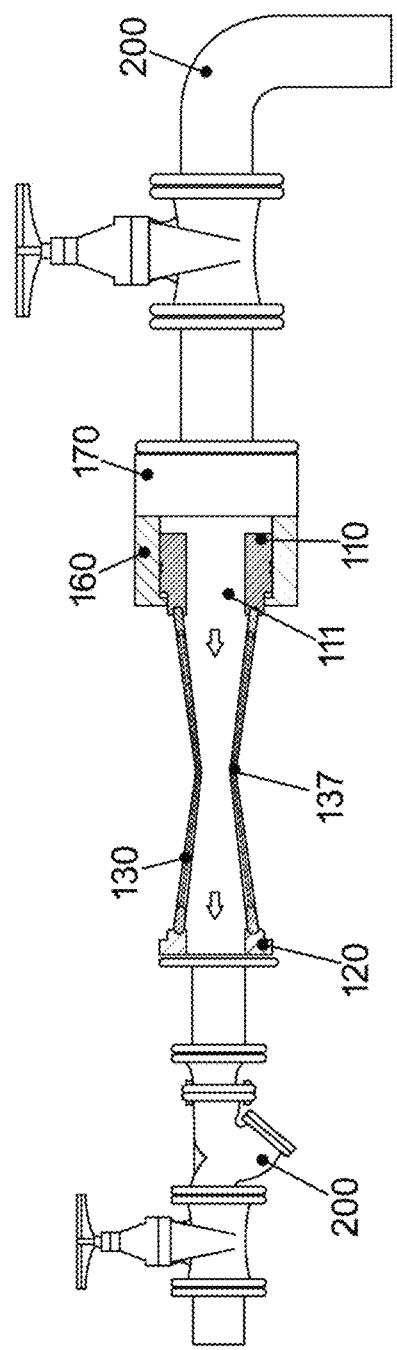
FIG. 15 shows a piping system incorporating the valve. In this example, the valve is depicted in a sectional view to display its internal structure in a closed position, thus showing the throat forming the narrowest section of the valve. The view uses the descriptive key to identify the various components of the valve, including the cylindrical cage made up of a plurality of elongated rods, the opposite flange, the driver flange, and the rotational coupling designed to house the driver flange within its coupling housing. The figure also identifies the usage of the rotary actuator and the microcontroller. The rotary actuator can have multiple configurations and mounting options (purposely not identified in this document), which can be configured to controllably rotate the driver flange, thereby adjusting the throat's diameter. In accordance with an exemplary embodiment of the present invention.

More specifically, this reduction in the diameter of the throat 137 increases the velocity and decreases the pressure of gases or fluids flowing through the piping system 200, shown in FIGS. 14 and 15.

Figure 16:
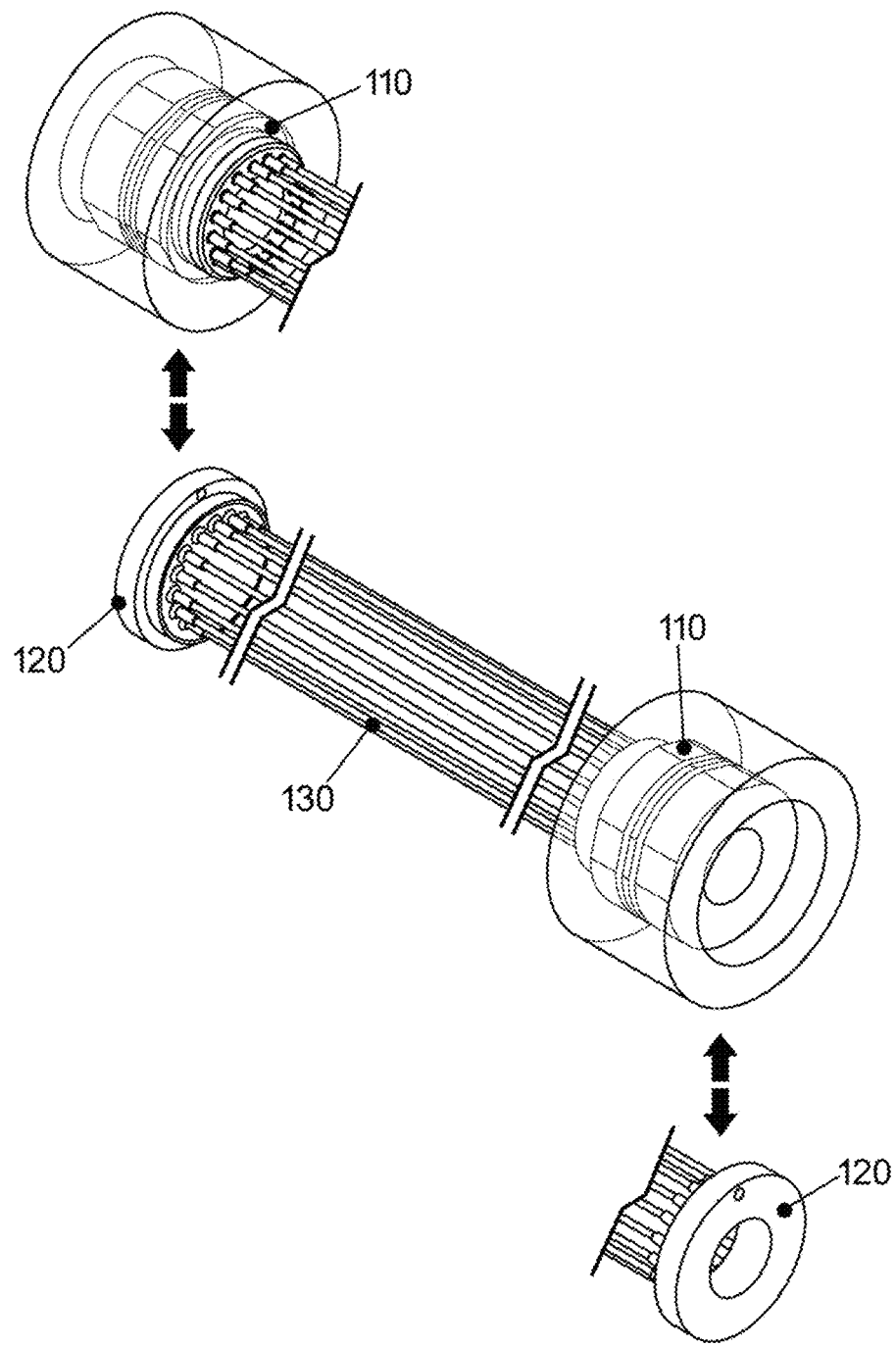
FIG. 16 provides three illustrations of the valve without the flexible rod covering. The primary purpose of this figure is to demonstrate that the driver flange and the opposite flange are interchangeable. Specifically, it is conceivable that an application determined by the end user may require switching the opposite flange with the driver flange or vice versa. In accordance with an exemplary embodiment of the present invention.
Figure 17:
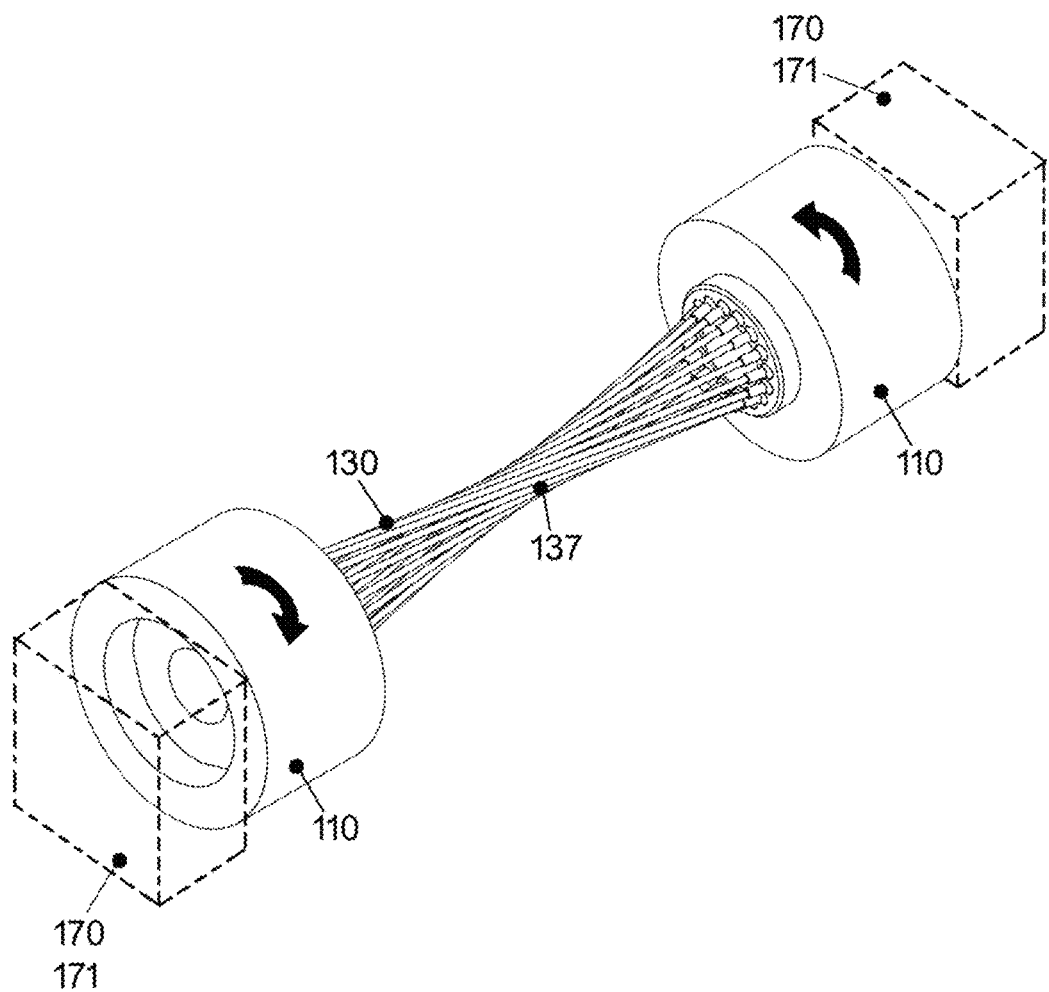
FIG. 17 shows the valve incorporating two driver flanges. The purpose of this figure is to illustrate that, depending on the end user's application, two driver flanges may be incorporated along with two rotary actuators, providing controllable rotation at both ends of the valve. Using two rotary actuators creates a valve system with redundancy or backup in case of failure of one actuator. This dual-actuator configuration is also beneficial when the elongated rods or flexible rod coverings are made from exotic materials. These materials may be necessary for specific applications due to their toughness or durability, but they can be less flexible, making rotation difficult with only one actuator. In accordance with an exemplary embodiment of the present invention
Figure 18:
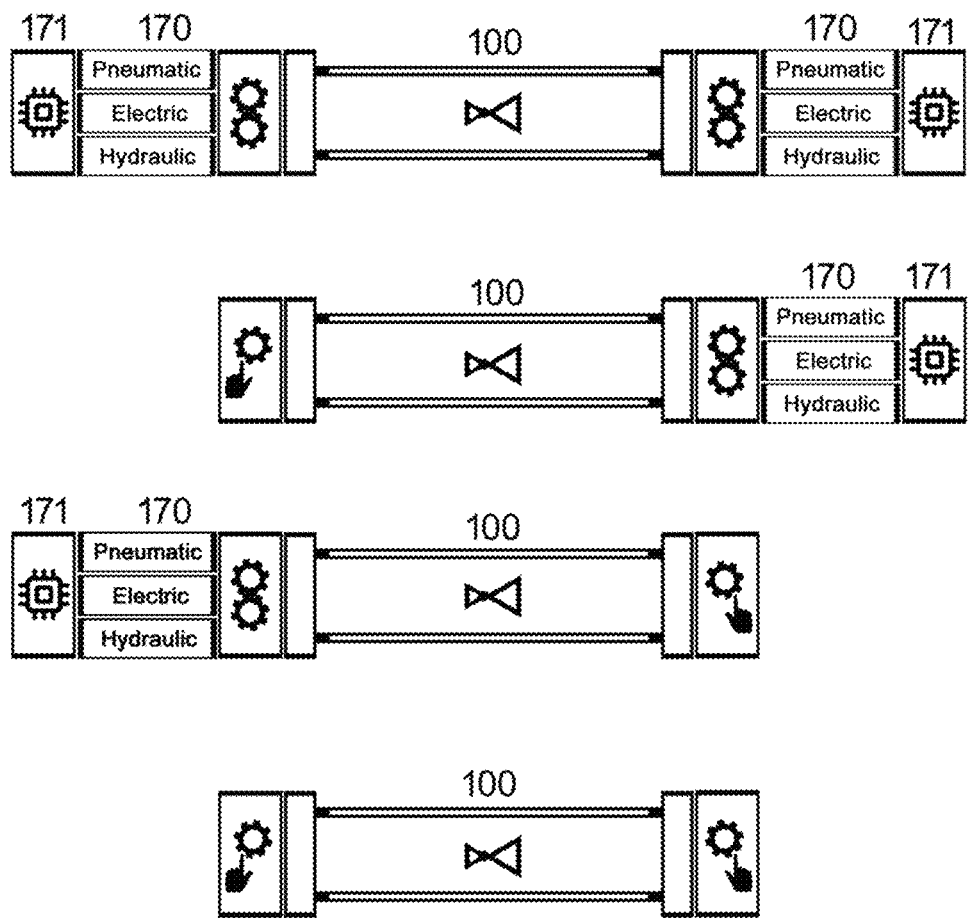
FIG. 18 presents different configurations of the controls used to operate the valve. The first example shows that the valve can employ two rotary actuators and two driver flanges, with either one being controlled by pneumatic, electric, or hydraulic forces. These forces, through a mechanical mechanism, can adjust the valve's rotation. The second set of illustrations shows that the valve may be controlled at one end by a manually adjustable mechanical device, while the other end is controlled by a rotary actuator with a microprocessor, powered by either pneumatic, electric, or hydraulic force. The final illustration demonstrates that, at the most basic level, the valve may be controlled manually at both ends, eliminating the need for rotary actuators or any other non-manual power sources. In accordance with an exemplary embodiment of the present invention.

As shown in FIGS. 16-18, the opposite flange 120, which remains stationary during the action of the rotary actuator 170, can be replaced with another driver flange, creating a valve 100 with two driver flanges 110, both controllable by either manual force or rotary actuators. Using two rotary actuators 170 creates a valve system with redundancy or backup in case of failure of one actuator. This dual-actuator configuration is also beneficial when the elongated rods 131 or the flexible rod covering 150 (including the interconnecting elements 151) are made from exotic materials. These materials may be necessary for specific applications due to their toughness or durability, but they can be less flexible, making rotation difficult with only one rotary actuator 170.

I claim:

1. A variable venturi valve, comprising:
   (A) a driver flange having:
      (a) a driver flange central hub configured to allow flow of pressurized fluids or gases through said driver flange;
   (B) an opposite flange positioned parallel to the driver flange having:
      (a) an opposite flange central hub configured to allow flow of pressurized fluids or gases through said opposite flange;
   (C) a plurality of elongated rods each having:
      (a) a rod driver end, and
      (b) a rod opposite end;
   (D) wherein said plurality of elongated rods are arranged in a substantially parallel configuration to form a cylindrical cage; said cylindrical cage comprising:
      (a) a cage middle section,
      (b) a cage driver end section comprising the rod driver ends, and
      (c) a cage opposite end section comprising the rod opposite ends;
   (E) a plurality of rod holders configured to fixedly fastened the cage driver end section to the driver flange and the cage opposite end section to the opposite flange;
   (F) a flexible rod covering configured to individually encase each of said elongated rods;
   (G) wherein said flexible rod covering further comprises of a plurality of interconnecting elements configured to join each of said elongated rods encased in said flexible rod covering along their lengths to facilitate flow of pressurized fluids or gases through the cylindrical cage;
   (H) wherein said cylindrical cage is sandwiched between the driver flange and the opposite flange and is configured to facilitate flow of pressurized fluids or gases between them;
   (I) wherein said driver flange is configured for connection to a rotary actuator;
   (J) wherein said rotary actuator is configured to facilitate controllable rotation of the driver flange resulting in narrowing of the cage middle section thereby creating a throat; and
   (K) wherein said throat is configured to controllably constrict flow of pressurized fluids or gases through a piping system incorporating said variable venturi valve.

2. The variable venturi valve of claim 1 wherein: said rotary actuator is configured to convert manual, mechanical, electrical, hydraulic, or pneumatic energy, either individually or in combination, into rotational motion.

3. The variable venturi valve of claim 1 wherein: said rotary actuator is controlled by a microcontroller.

4. The variable venturi valve of claim 1 wherein: said rotary actuator is a device selected from a group consisting of servo motor, stepper motor, rotary valve system, and rotary gearing system.

5. The variable venturi valve of claim 1 wherein: each of said elongated rods is made from material selected from a group consisting of metals, plastics, and composite materials.

6. The variable venturi valve of claim 1 wherein: said flexible rod covering is made from material selected from a group consisting of rubber, plastic, reinforced-textiles, and composite materials.

7. The variable venturi valve of claim 1 wherein: said opposite flange is replaceable by a second driver flange; said second driver flange having identical characteristics and functionality as the driver flange.

8. The variable venturi valve of claim 7 wherein: wherein said second driver flange is configured to be rotated by a second rotary actuator either in conjunction with the rotary actuator or independently; said second rotary actuator having identical characteristics and functionality as the rotary actuator.

9. The variable venturi valve of claim 7 wherein: said rotation by the second rotary actuator results in narrowing of the throat, thereby constricting flow of pressurized fluids or gases through the piping system incorporating said variable venturi valve.

10. The variable venturi valve of claim 1 further comprising: a rotational coupling having a coupling housing is configured to rotationally hold the driver flange and facilitate controlled connection of the driver flange to the rotary actuator.

11. A method for controllably constricting flow of pressurized fluids or gases through a piping system using a variable venturi valve, comprising:
   (A) providing a driver flange having a driver flange central hub configured to allow flow of pressurized fluids or gases through said driver flange;
   (B) providing an opposite flange positioned parallel to the driver flange having an opposite flange central hub configured to allow flow of pressurized fluids or gases through said opposite flange;
   (C) providing a plurality of elongated rods each having a rod driver end, and a rod opposite end;
   (D) arranging said plurality of elongated rods in a substantially parallel configuration to form a cylindrical cage; said cylindrical cage comprising
      (a) a cage middle section,
      (b) a cage driver end section made up of the rod driver ends, and
      (c) a cage opposite end section made up of the rod opposite ends;
   (E) providing a plurality of rod holders configured to fixedly fastened the cage driver end section to the driver flange and the cage opposite end section to the opposite flange;
   (F) providing a flexible rod covering configured to individually encase each of said elongated rods which are joined by a plurality of interconnecting elements along their lengths to facilitate flow of pressurized fluids or gases through the cylindrical cage;
   (G) positioning said cylindrical cage encased in said flexible rod covering joined by the plurality of interconnecting elements between the driver flange and the opposite flange; and (H) providing a rotary actuator configured to facilitate controllable rotation of the driver flange resulting in narrowing of the cage middle section thereby creating a throat;

whereby the cylindrical cage connects the diver flange to the opposite flange forming the variable venturi valve, which is placed within the piping system;

wherein the rotary actuator enables controllable rotation of the driver flange, thereby creating the throat at the cage middle section, which constricts flow of pressurized fluids or gases through the piping system.

12. The method of claim 11 further comprising: providing a rotational coupling having a coupling housing configured to rotationally hold the driver flange thereby facilitating controlled connection of the driver flange to the rotary actuator.

13. The method of claim 11 wherein: said rotary actuator converts manual energy, mechanical energy, electrical energy, hydraulic energy, or pneumatic energy into rotational motion, either alternatively or in combination thereof.

14. The method of claim 11 further comprising: providing a microcontroller configured to regulate controllable rotation of the rotary actuator.

15. The method of claim 11 wherein: said rotary actuator further comprises a motor controlled by the microcontroller, wherein said microcontroller regulates the rotational movement of said driver flange based on input parameters such as flow rate, pressure, or temperature.

16. The method of claim 11 wherein: said rotary actuator is a device selected from a group consisting of servo motor, stepper motor, rotary valve system, and rotary gearing system.

17. The method of claim 11 wherein: each of said elongated rods is made from material selected from a group consisting of metals, plastics, and composite materials.

18. The method of claim 11 wherein: said flexible rod covering is made from material selected from a group consisting of rubber, plastic, reinforced-textiles, and composite materials.

19. A method for controlling gases and fluid flow in a piping system, comprising:
  (A) providing a variable venturi valve comprising a plurality of elongated rods arranged in a substantially parallel configuration to form a cylindrical cage having a middle cage section;
  (B) placing said cylindrical cage between a driver flange, and an opposite flange;
  (C) connecting said driver flange and said opposite flange to said cylindrical cage;
  (D) providing a flexible rod covering configured to individually encase each of said elongated rods which are joined by a plurality of interconnecting elements along their lengths to facilitate the gases and fluid flow through the cylindrical cage, the driver flange and opposite flange;
  (E) positioning said variable venturi valve within said piping system;
  (F) actuating said driver flange using a rotary actuator to control the gases and fluid flow through said piping system; and
  (G) wherein said actuating creates a throat at the middle cage section to constrict the gases and fluid flow through said piping system.

20. The method of claim 19, wherein said rotary actuator further comprises a motor controlled by a microcontroller; wherein said microcontroller regulates rotational motion of said driver flange based on input parameters such as flow velocity, pressure, or temperature.

* * * * *